(12) United States Patent
Cadix

(10) Patent No.: US 10,150,702 B2
(45) Date of Patent: Dec. 11, 2018

(54) FILTRATE CONTROL AGENTS IN SOLID FORM

(71) Applicant: RHODIA OPERATIONS, Paris (FR)

(72) Inventor: Arnaud Cadix, Saint-Ouen (FR)

(73) Assignee: RHODIA OPERATIONS, Paris (FR)

( * ) Notice: Subject to any disclaimer, the term of this patent is extended or adjusted under 35 U.S.C. 154(b) by 361 days.

(21) Appl. No.: 14/373,689

(22) PCT Filed: Jan. 25, 2013

(86) PCT No.: PCT/EP2013/051461
§ 371 (c)(1),
(2) Date: Jul. 22, 2014

(87) PCT Pub. No.: WO2013/110773
PCT Pub. Date: Aug. 1, 2013

(65) Prior Publication Data
US 2015/0133346 A1 May 14, 2015

(30) Foreign Application Priority Data
Jan. 25, 2012 (FR) ..................... 12 00215

(51) Int. Cl.

| | | |
|---|---|---|
| *C04B 24/38* | (2006.01) | |
| *C08J 3/24* | (2006.01) | |
| *C08B 37/00* | (2006.01) | |
| *C09K 8/12* | (2006.01) | |
| *C09K 8/08* | (2006.01) | |
| *C09K 8/512* | (2006.01) | |
| *C04B 24/26* | (2006.01) | |
| *C04B 24/00* | (2006.01) | |
| *C09K 8/68* | (2006.01) | |
| *C09K 8/487* | (2006.01) | |
| *C08K 5/00* | (2006.01) | |
| *C04B 24/30* | (2006.01) | |
| *C09K 8/035* | (2006.01) | |
| *C09K 8/516* | (2006.01) | |
| *C09K 8/70* | (2006.01) | |
| *C08F 8/28* | (2006.01) | |
| *C04B 103/46* | (2006.01) | |

(52) U.S. Cl.
CPC ............ *C04B 24/38* (2013.01); *C04B 24/008* (2013.01); *C04B 24/2623* (2013.01); *C04B 24/2652* (2013.01); *C04B 24/30* (2013.01); *C08B 37/0033* (2013.01); *C08F 8/28* (2013.01); *C08J 3/24* (2013.01); *C08K 5/0025* (2013.01); *C09K 8/035* (2013.01); *C09K 8/08* (2013.01); *C09K 8/12* (2013.01); *C09K 8/487* (2013.01); *C09K 8/512* (2013.01); *C09K 8/516* (2013.01); *C09K 8/685* (2013.01); *C09K 8/70* (2013.01); *C04B 2103/46* (2013.01); *C08J 2305/00* (2013.01); *C08J 2329/04* (2013.01)

(58) Field of Classification Search
None
See application file for complete search history.

(56) References Cited

U.S. PATENT DOCUMENTS

| | | | |
|---|---|---|---|
| 3,379,703 A | 4/1968 | Ehmann et al. | |
| 3,408,429 A | 10/1968 | Wichterle | |
| 5,594,050 A * | 1/1997 | Audebert | ............ C04B 24/2623 524/2 |
| 6,180,689 B1 | 1/2001 | Moulin | |
| 6,312,515 B1 * | 11/2001 | Barlet-Gouedard | ........................ C04B 20/008 106/709 |
| 6,984,705 B2 | 1/2006 | Chang et al. | |
| 2008/0096774 A1 | 4/2008 | Tabary et al. | |

FOREIGN PATENT DOCUMENTS

| | | |
|---|---|---|
| BE | 657268 A | 6/1965 |
| FR | 2704219 A1 | 10/1994 |
| FR | 2759364 A1 | 8/1998 |
| WO | WO 2006024795 A2 | 3/2006 |

OTHER PUBLICATIONS

Ramires et al., Biocompatibility of poly(vinyl alcohol)-hyaluronic acid and poly(vinyl alcohol)-gellan membranes crosslinked by glutaraldehyde vapors. J Mater Sci Mater Med. Jan. 2002;13(1):119-23.*

* cited by examiner

Primary Examiner — Jeffrey D Washville

(57) ABSTRACT

The present invention relates to a process for preparing control agents for applications in the petroleum field, where a polymer bearing —OH, amine and/or amide functions, which is in the form of a divided solid, is reacted with at least one crosslinking agent bearing at least two —R groups capable of reacting with the —OH, amine or amide groups, under conditions where said polymer remains in solid form and where said crosslinking agent is at least partly in vapor form, The invention also relates to the control agents obtained in solid form according to this process, and also to the mixtures of these solid agents with other additives, which can be used in particular for the preparation of cement grout for oil extraction.

16 Claims, No Drawings

FILTRATE CONTROL AGENTS IN SOLID FORM

CROSS-REFERENCE TO RELATED APPLICATIONS

The present application is a U.S. national stage entry under 35 U.S.C. § 371 of International Application No. PCT/EP2013/051461 filed Jan. 25, 2013, which claims priority to FR Application No. 12.00215 filed on Jan. 25, 2012, the whole content of this application being herein incorporated by reference for all purposes.

The present invention relates to the field of oil extraction. It relates in particular to fluid loss control agents in fluids injected under pressure which comprise insoluble constituents.

In the field of oil extraction, numerous stages are carried out by injecting fluids under pressure within oil-bearing rocks. This is in particular the case during the injection of drilling fluids or fracturing fluids. Another more specific case is that of oil cement grouts, which are employed for the cementation of the annulus of oil wells according to a method well-known per se, for example described in *Le Forage* by J. P Nguyen (Editions technip 1993). These oil cement grouts are injected under pressure within a metal casing introduced into the drilling hole of the oil wells, then rise again, under the effect of the pressure, via the "annulus" space located between the casing and the drilling hole, and then set and harden in this annulus, thus ensuring the stability of the well during drilling.

When these fluids, employed under pressure, comprise insoluble compounds (as is the case with oil cement grouts, for example, or else drilling fluids comprising polymers), bringing the fluid under pressure into contact with the rock (which generally exhibits a more or less high porosity, indeed even cracks) induces a "fluid loss" effect, the liquid present in the fluid having a tendency to penetrate into the rock, thus bringing about an effect of concentration of the fluid, which can result in a related increase in viscosity which affects the mobility of the fluid. In the case of cement grouts, the fluid loss can in addition result in excessively rapid setting of the cement, before the space of the annulus is cemented, which can in particular weaken the structure of the well and harm its leaktightness. For further details relating to the fluid loss effect, reference may in particular be made to *Well Cementing*, E. B. Nelson (Elsevier, 1990).

In order to inhibit, indeed even prevent, the phenomenon of fluid loss, it is recommended to add, to the fluids of the abovementioned types, "fluid loss control agents" which make it possible to limit, indeed even in some cases completely prevent, the escape of the liquid present in the fluid toward the rock with which it comes into contact. These fluid loss control agents generally make it possible to obtain, in parallel, an effect of control of the migration of gases, namely isolation of the fluid with respect to the gases present in the rock (gases which it is advisable to prevent from penetrating into the fluid, in particular in the case of cement grouts, these gases having a tendency to weaken the cement being formed (in the course of setting).

Various fluid loss control agents of the abovementioned type have been provided, which include in particular cellulose derivatives (for example hydroxyethylcellulose) or alternatively AMPS-based copolymers.

In the field of oil cement grouts, recommended additives are polyvinyl alcohols, often denoted by their acronym PVA, which exhibit the advantage of not slowing down the setting of the cement, in contrast to other additives, such as, for example, hydroxyethylcellulose. These PVAs have been employed in different forms, in particular in the form of linear polymers or else more advantageously in the crosslinked form, forming microgels in an aqueous medium. For further details on this subject, reference may in particular be made to the patent applications FR 2 704 219 or FR 2 759 364. The processes of synthesis described for these polymers are generally carried out in an aqueous medium and result in the formation of dilute solutions or microgels, in particular in the case of crosslinked PVAs.

The production of the PVA microgels in a form diluted in a large amount of water presents difficulties in terms of volume (in particular as regards their storage and their transportation), indeed even in terms of formulation (if it is desired to incorporate these PVAs at high concentration, for example). In addition, dilute PVA solutions are sensitive to freezing and thus cannot be employed in case of freezing. In some cases, these problems can be solved by removing all or part of the solvent but this is then accompanied by a significant additional cost for the manufacture of the product.

One aim of the present invention is to provide an advantageous novel access route to crosslinked PVAs or to similar molecules, of use in particular as fluid loss control agent, which does not exhibit the disadvantages of the processes currently known.

To this end, the present invention provides a novel process for the manufacture of crosslinked compounds, of use inter alia as fluid loss control agent, which makes it possible to obtain these compounds in a solid form.

More specifically, a subject matter of the present invention is a process for the preparation of a fluid loss control agent, in the solid form, said process comprising a stage (E1) where:

a polymer carrying several hydroxyl (—OH) and/or amine and/or amide functional groups, in the form of a divided solid, is reacted with at least one crosslinking agent carrying at least two —R groups capable of reacting with the —OH, amine or amide groups of said polymer under the conditions of stage (E1) in order to form a covalent bond between the polymer and the crosslinking agent, said stage (E1) being carried out under temperature and pressure conditions where said polymer remains in the solid form and where said crosslinking agent is at least partially (for example completely) in the vapor form, whereby a crosslinking of the polymer within the particles of the divided solid is obtained.

Subsequent to stage (E1), the process of the invention generally comprises a stage (E2) of recovery of the solid obtained on conclusion of stage (E1).

The process of the invention makes it possible to obtain the control agents in a solid form, which can subsequently be redissolved in order to obtain fluids suitable for use in the field of oil extraction. These agents in the solid form exhibit the advantage of being easier to store and to transport in terms of volume and weight than the corresponding liquid compositions.

Furthermore, the process results in fluid loss control agents which are in a form which is very easy to formulate. They can, for example, be dry blended with other solid ingredients, be stored or transported in the form of such blends and be employed on the site of their use by simple mixing with water.

In addition, it turns out that the process of the invention generally requires less in the way of crosslinking agents than in the processes of the state of the art in order to obtain the same degree of crosslinking, this being in particular the case when stage (E1) is carried out on a PVA. On that subject, without wishing to be committed to a specific theory, it appears possible to hypothesize that the use of stage (E1) with the polymer of PVA type specifically in the solid state appears to result in (useful) intermolecular crosslinkings being favored in comparison with (effect-free) intramolecular crosslinkings. In other words, the process of the invention appears to result in an optimization of the use of the crosslinking agents, which can in particular be reflected in terms of reduction in costs.

Stage (E1) of the process of the invention can be carried out on numerous polymers, with the proviso that they are polymers carrying several —OH and/or amide groups capable of reacting with the coupling agent.

According to an advantageous embodiment of the invention, the polymer employed in stage (E1) is a polyvinyl alcohol (PVA). Alternatively, it can be a copolymer of polyvinyl alcohol and of other monomer units, it being possible for these copolymers to comprise, for example, in addition to the polyvinyl alcohol units, up to 30 mol % of anionic units (such as carboxylic acids or sulfonate groups), cationic units (such as amines or quaternary ammoniums) or neutral units (such as vinylpyrrolidone units).

Alternatively, the polymer of stage (E1) can be a hydroxylated biopolymer carrying several —OH groups, such as, for example, a guar or else a xanthan gum.

According to another specific embodiment, the polymer of stage (E1) is a polymer carrying several amide functional groups, for example a polyacrylamide.

According to another specific embodiment, the polymer of stage (E1) is a polymer carrying several amine functional groups, for example a polyvinylamine or polyethyleneimine.

Whatever the exact nature of the polymer employed in stage (E1), this polymer is employed in the form of a divided solid during this stage. The term "divided" is understood to mean that the polymer is in the form of solid objects (particles, aggregates of particles, powder or granules, it being possible for these objects to be isotropic or anisotropic, for example of the fiber or fibril type), the particle size of which is less than 1 cm with a mean particle size typically of between 1 micron and 100 microns for the isotropic objects. For the anisotropic objects, the smallest dimension (the diameter in the case of the fibers) is preferably between 1 micron and 250 microns, for example between 1 micron and 100 microns, and the greatest dimension preferably remains less than 1 cm.

The crosslinking agent employed in stage (E1) is, for its part, a compound sufficiently volatile to be able to be employed in the vapor form in stage (E1). It is typically a compound having a boiling point of less than or equal to 150° C. at atmospheric pressure. Molecules having a greater boiling point can optionally be employed as crosslinking agent in stage (E1), under reduced pressure. Furthermore, a vaporization agent which forms an azeotrope with the crosslinking agent can be used to advantageously reduce the vaporization temperature of the latter.

The at least two —R groups present on the crosslinking agent and suitable for forming covalent bonds by reaction with the —OH and/or amine and/or amide groups of the polymer can be identical or different. They are generally but not necessarily identical.

The nature of these —R groups can vary to a large extent.

According to a particularly advantageous embodiment, the —R groups present on the crosslinking agent of stage (E1) are aldehyde —CHO groups. In this context, according to a specific alternative form, the crosslinking agent employed is glutaraldehyde. Alternatively, the crosslinking agent can be another compound carrying at least two aldehyde functional groups, such as, for example, glyoxal or succindialdehyde, or else a mixture of compounds carrying aldehyde functional groups. These compounds carrying aldehyde groups generally have a relatively low boiling point.

According to another embodiment, the —R groups present on the crosslinking agent of stage (E1) are isocyanate groups. Generally, these compounds are less volatile than the abovementioned compounds comprising aldehydes and they are preferably employed under reduced pressure in stage (E1). Use may be made, among the isocyanates, for example, of isophorone diisocyanate, hexamethylene diisocyanate or toluene diisocyanate, for example, which, under reduced pressure, exhibit boiling points compatible with the implementation of stage (E1).

The crosslinking obtained in stage (E1) can be adjusted as a function of the ratio by weight of the total weight of crosslinking agent employed in stage (E1) with respect to the total weight of the polymer before the crosslinking, denoted by "crosslinking agent/polymer ratio by weight". This ratio can vary to a fairly large extent as a function of the degree of crosslinking desired. As indicated above in the present description, the process of the invention makes it possible to obtain efficient crosslinking and for this reason requires amounts of crosslinking agent which are generally lower than in the processes of the state of the art in order to obtain similar effects. Generally, advantageous effects are obtained with a crosslinking agent/polymer ratio by weight of less than 2%, for example between 0.01% and 1%, in particular between 0.1% and 0.5%. These ratios are particularly well suited in particular in the case where the polymer is a PVA and where the crosslinking agent is glutaraldehyde. This ratio is generally to be adjusted to the molar mass of the polymer to be crosslinked, the degree of crosslinking to be achieved generally being lower in proportion as the molar mass of the polymer increases.

Stage (E1) is typically carried out within a confined reactor, which makes it possible to optimize the operation in which the polymer in the solid state and the crosslinking agent in the vapor state are brought into contact.

According to an alternative embodiment, stage (E1) can be carried out by bringing the polymer in the divided state into contact with a gas stream comprising the crosslinking agent.

Furthermore, the temperature of stage (E1) can vary to a fairly large extent as a function of the exact nature of the compounds brought together during stage (E1). Typically, stage (E1) is carried out at a temperature of less than 150° C., preferably at a temperature of greater than 50° C., for example between 100 and 150° C. The temperature is to be adjusted as a function of the thermal stability range of the compounds employed and of the conditions imposed with respect to the solid nature of the polymer during stage (E1).

According to a specific embodiment, stage (E1) is carried out in the presence of a catalyst suitable for activating the reaction between the —R groups of the crosslinking agent and the —OH or amide groups of the polymer. In this case, the catalyst is generally employed in the vapor (gas) form during stage (E1).

Thus, when the coupling agent carries an aldehyde group, for example (in particular when it is glutaraldehyde), stage (E1) is advantageously carried out in the presence of an organic acid, for example acetic acid, employed in the vapor form.

According to a specific alternative form (alternative form 1), stage (E1) of the process of the invention is carried out by first producing a blend of the polymer in the form of a divided solid with a second divided solid comprising the crosslinking agent and by then holding this blend under the temperature and pressure conditions where the polymer remains in the solid form and where said crosslinking agent is at least partially in the vapor form (the catalyst, if appropriate, preferably being itself also at least partially in the vapor form). According to this alternative form, the second divided solid which is blended with the polymer in the solid form can, for example, be:

- a solid comprising the crosslinking agent in the solid form, it optionally being possible for this solid to additionally comprise a catalyst of the abovementioned type, in the solid or liquid form; or
- a solid comprising the crosslinking agent in the liquid form deposited on a solid support, for example on silica particles, it optionally being possible for this solid to additionally comprise a catalyst of the abovementioned type, in the solid or liquid form.

According to another specific alternative form (alternative form 2), stage (E1) of the process of the invention is carried out by injecting the crosslinking agent in the liquid form within a confined reactor within which temperature and pressure conditions prevail where said polymer remains in the solid form and where said crosslinking agent is at least partially in the vapor form, whereby the crosslinking agent, introduced in the liquid form, vaporizes within the reactor. According to this alternative form, it is optionally possible to coinject a catalyst of the abovementioned type, in the liquid state, during the injection of the crosslinking agent (typically, it is possible, in order to do this, to inject, into the reactor, a liquid composition comprising, as a mixture, the crosslinking agent and the catalyst or else to coinject two liquid compositions comprising, for one, the crosslinking agent and, for the other, the catalyst).

The two alternative forms of the process as defined above (alternative forms 1 and 2) generally prove to be highly advantageous, in particular in that they result in an optimized distribution of the crosslinking agent during stage (E1). In addition, they generally make it possible to prevent interparticulate agglomeration between the polymer particles.

According to a more specific aspect, another subject matter of the present invention is the fluid loss control agents in the solid form of the type obtained according to the abovementioned stage (E1).

The process of the invention makes it possible to synthesize control agents in the form of a divided solid exhibiting an adjustable particle size distribution. The particle size distribution of the solid control agent on conclusion of stage (E1) is substantially that of the polymer employed in the solid state. This is because, generally, the crosslinking carried out by the reaction of the crosslinking agent during stage (E1) does not affect the particle size distribution.

It should be noted that the process of the invention makes it possible not only to directly obtain control agents directly in the solid state, which represents an undeniable advantage as regards the process, but also makes possible access to more specific particle size distributions (in particular narrower and better defined) than those achieved by drying control agents obtained by the methods described in the patent applications FR 2 704 219 and FR 2 759 364. In fact, stage (E1) of the process of the invention results in a control agent in the solid form having a particle size distribution substantially similar (and generally identical) to that of the particle size distribution of the solid polymer employed in this stage.

Furthermore, as indicated above, the control agents prepared according to the invention generally exhibit a specific crosslinked structure, distinct in particular from that which is obtained by employing the aqueous-phase crosslinking methods described in the state of the art.

The solid control agents obtained according to the invention, which can be easily stored, transported and formulated, can be incorporated in aqueous fluids of use for oil extraction. Typically, these control agents according to the invention have a reduced impact (indeed even no significant impact) on the rheology of the cement grout, in particular more reduced than that of polymer having a non-crosslinked structure.

The control agents obtained according to the present invention prove in particular to be of use as fluid loss control agents and/or they can also be employed as agents which inhibit gas migration, in fluid compositions, in particular aqueous compositions, for oil application. More specifically, they can be used to improve the gas migration and/or fluid loss control properties of an oil cement grout (cementation composition), of a drilling fluid for oil application or of a hydraulic fracturing fluid or of a completion or diversion fluid (or fluid for modifying relative permeability), such as employed, for example, in the processes described in WO2006/024795 and U.S. Pat. No. 6,984,705. These specific applications constitute another specific subject matter of the present invention.

According to a specific embodiment, stage (E1) of the process of the invention is followed by a stage (E3), where the solid obtained on conclusion of stage (E1) is blended with other solid compounds.

Advantageously, this stage (E3) is carried out by blending the solid obtained on conclusion of stage (E1) with other solid ingredients suitable for forming a fluid of use in the field of oil extraction, for example an oil cement grout, or else a drilling or fracturing fluid for oil application, in which case the solid obtained on conclusion of stage (E1) is blended with solid oil grout constituents. Alternatively, in stage (E3), the solid obtained on conclusion of stage (E1) is blended with drilling fluid or fracturing fluid additives.

The blends of solid constituents obtained on conclusion of stage (E3), also denoted by the term "preblends", are typically solid preblends for the manufacture of a fluid of use in the field of oil extraction. They constitute a very easy means of transporting the constituents of a composition of oil cement grout type, of a drilling fluid for oil application or of a fracturing fluid for oil application, in a pre-metered ready-for-use form, which it is sufficient to blend with a fluid (seawater or river water, for example) on the site of use. These specific blends, to which the solid constituents obtained on conclusion of stage (E1) give access, constitute, according to another aspect, another specific subject matter of the invention.

Various aspects and advantages of the invention will be further illustrated by the examples below, in which the polymers were prepared according to the process of the invention.

EXAMPLE 1: PREPARATION OF AN AGENT A1 ACCORDING TO THE INVENTION

An agent according to the invention was prepared under the following conditions:

A polyvinyl alcohol of Celvol E 26/88 (Sekisui) grade, available commercially in the form of granules, was ground in order to be put into the form of a powder. This powder is sieved and the fraction between the 40 and 100 μm sieves is used here and denoted (P).

At the same time, a solid composition (C) was prepared by absorbing an aqueous solution of glutaraldehyde and acetic acid on porous silica (Tixosil 38X silica, sold by Rhodia). This composition (C), which comprises 20% of glutaraldehyde, was obtained by adding, to silica, with stirring, a solution comprising glutaraldehyde at 50% in water and acetic acid. The final composition by weight of the composition (C) is:

56% of Tixosil 38X silica
40% of a 50% by weight aqueous glutaraldehyde solution; and
4% of acetic acid.

20 g of powder (P) and 1 g of the composition (C) were intimately blended and then the blend obtained was placed in a hermetically closed Teflon-coated cell (model 4748 acid digestion cell provided by Parr Instruments Company, hereinafter denoted by "Parr bomb") and was rotated in a rolling oven and brought to 120° C. for 5 hours in this confined reactor.

On conclusion of this reaction, a powder was obtained which was placed in a ventilated oven at 60° C. in order to remove the water, the acetic acid and the possible excess glutaraldehyde therefrom, whereby the agent A1 was obtained in the form of a pulverulent solid (particle size distribution of the order of 40 to 100 microns).

EXAMPLE 2: PREPARATION OF AN AGENT A2 ACCORDING TO THE INVENTION

An agent according to the invention was prepared under the same conditions as in example 1, except that the blend introduced into the Parr bomb comprises 20 g of powder (P) and 1.15 g of the composition (C), whereby the agent A2 was obtained in the form of a pulverulent solid (particle size distribution of the order of 40 to 100 microns).

EXAMPLE 3: EVALUATION OF THE AGENTS A1 AND A2 IN CEMENT GROUTS

Each of the two agents A1 and A2 prepared in examples 1 and 2 was used to prepare an oil cement grout having the same following formulation:

| | |
|---|---|
| Municipal water: | 334.4 g |
| Dispersing agent (polymelamine sulfonate): | 8.6 g |
| Retarding agent (calcium lignosulfonate): | 4.4 g |
| Organic antifoaming agent: | 2.1 g |
| Dykheroff black label cement (API Class G): | 781.5 g |
| Agent (A1 or A2): | 5 g |

The cement and the agent A1 or A2 are preblended in the solid form before dispersion in the liquids.

The formulation and the filtration test are carried out according to the standard of the American Petroleum Institute (API recommended practice for testing well cements, 10B, 22nd edition, December 1997). After blending and dispersing all the constituents of the formulation, the grout obtained is conditioned at 88° C. for 20 minutes in an atmospheric consistometer (model 1250 supplied by Chandler Engineering Inc.), prestabilized at this temperature, which makes it possible to simulate the conditions experienced by the cement grout during descent in a well.

The viscosities of the various formulations are determined using a viscosimeter of Chan 35 type (supplied by Chandler Engineering Inc.). The "plastic" viscosity (PV) and yield point (Ty) values are calculated by applying the "2-point" method, the cement grout being regarded as a Bingham fluid.

The fluid loss control performance is determined by a static filtration at 88° C. in a double-ended cell with a capacity of 175 ml equipped with 325 mesh×60 mesh metal screens (supplied by Ofite Inc., reference 170-45). The performances of the additives A1 and A2 in the cement formulations are given in the table below:

| Agent employed | A1 | A2 | Starting powder (P) |
|---|---|---|---|
| API Vol (ml after 30 min under 70 bar) | 52 | 41 | 590 (calc.) |
| PV (cP) 20° C. | 72 | 78 | 54 |
| Ty (lb/100 ft$^2$) 20° C. | 2 | 0 | 1 |
| PV (cP) 88° C. | 41 | 45 | 51 |
| Ty (lb/100 ft$^2$) 88° C. | 5 | 8 | 9 |

The additives A1 and A2, while not having a significant impact on the rheology of the cement grout, make it possible to efficiently control the fluid loss.

EXAMPLE 4: PREPARATION OF AN AGENT A3 ACCORDING TO THE INVENTION

An agent according to the invention was prepared under the following conditions:

A powder (P) formed of xanthan of Rhodopol 23P (Rhodia) grade which is commercially available is used here.

The glutaraldehyde pre-absorbed on silica in order to be used in the form of a composition (C) identical to that of example 1.

20 g of powder (P) and 0.25 g of the composition (C) were intimately blended and then the blend obtained was placed in a hermetically closed Parr bomb and was rotated in a rolling oven and brought to 120° C. for 5 hours in this confined reactor.

On conclusion of this reaction, a powder was obtained which was placed in a ventilated oven at 60° C. in order to remove the water, the acetic acid and the possible excess glutaraldehyde therefrom, whereby the agent A3 was obtained in the form of a pulverulent solid.

EXAMPLE 5: PREPARATION OF AN AGENT A4 ACCORDING TO THE INVENTION

A crosslinked xanthan agent according to the invention was prepared under the same conditions as in example 4, except that the blend introduced into the Parr bomb comprises 20 g of powder (P) and 0.5 g of the composition (C), whereby the agent A4 is obtained in the form of a pulverulent solid.

EXAMPLE 6: EVALUATION OF THE AGENTS A3 AND A4 IN A DRILLING (OR HYDRAULIC FRACTURING) FLUID

Each of the two agents A3 and A4 prepared in examples 4 and 5 was used to prepare a simplified drilling mud of following formula:

| | |
|---|---:|
| Water | 400 g |
| Potassium chloride | 8 g |
| Xanthan (Rhodopol 23P) | 1.2 g |
| Agent (A3, A4 or unmodified xanthan) | 0.8 g |

The formulation and the filtration test are carried out according to the standard of the American Petroleum Institute (API 13B-1, "Recommended practice for field testing water-based drilling fluids", $3^{rd}$ edition, December 2003). After blending and dispersing all the constituents of the formulation, the grout obtained is conditioned at 80° C. for 20 minutes in an atmospheric consistometer (model 1250 supplied by Chandler Engineering Inc.), prestabilized at this temperature, which makes it possible to simulate the conditions experienced by the drilling fluid during descent in a well.

The viscosities of the various formulations are determined using a viscosimeter of Chan 35 type (supplied by Chandler Engineering Inc.). The "plastic" viscosity (PV) and yield point (Ty) values are calculated by applying the "2-point" method, the cement grout being regarded as a Bingham fluid.

The fluid loss control performance is determined by a static filtration at 80° C. in a single-ended cell with a capacity of 175 ml equipped with a filter paper (supplied by Ofite Inc., reference 170-12-1).

| Agent employed | A3 | A4 | Unmodified xanthan |
|---|---|---|---|
| Volume filtered after 30 min under 35 bar | 35 | 29 | 87 |
| PV (cP) 80° C. | 10 | 10 | 14 |
| Ty (lb/100 ft$^2$) 80° C. | 7 | 7 | 13 |

The additives A3 and A4, while not having a significant impact on the rheology of the drilling mud, demonstrate a good performance as fluid loss control agent.

EXAMPLE 7: PREPARATION OF AN AGENT A5 ACCORDING TO THE INVENTION

An agent according to the invention was prepared under the following conditions:

A polyvinyl alcohol of Celvol E26/88 grade was ground in order to be put into the form of a powder with a median diameter of 140 μm (denoted P').

The solid composition (C), the preparation of which is described in example 1, is used here.

1.5 kg of powder (P') and 30 g of the composition (C) are introduced into a hermetic solid blender equipped with a stirrer of plowshare type and with a jacket for the control of the temperature. The blend is kept stirred for 5 hours at a temperature of 120° C.

On conclusion of this reaction, the powder obtained is placed in a ventilated oven at 60° C. in order to remove the water, the acetic acid and the possible excess glutaraldehyde therefrom. The agent A5 thus obtained in the form of a pulverulent solid, for which the ratio by weight of glutaraldehyde introduced to the powder P' is 0.4%.

EXAMPLE 8: EVALUATION OF THE AGENT A5 IN CEMENT GROUTS

The agent A5 prepared in example 7 was used to produce an oil cement grout having the same formulation as in example 3.

The protocol followed for the preparation, the conditioning and the test of the grouts is identical to that described in example 3.

| Agent employed | A5 | Powder (P') |
|---|---|---|
| Glutaraldehyde introduced/P' | 0.4% | 0 |
| API Vol (ml after 30 min under 70 bar) | 26 | 588 (calc.) |
| PV (cP) 20° C. | 45 | 55 |
| Ty (lb/100 ft$^2$) 20° C. | 0 | 1 |
| PV (cP) 88° C. | 68 | 50 |
| Ty (lb/100 ft$^2$) 88° C. | 8 | 9 |

The additive A5, while not having a significant impact on the rheology of the cement grout, makes it possible to efficiently control the fluid loss.

The invention claimed is:

1. A process for the preparation of a fluid loss control agent, in the solid form, comprising a stage (E1) where a polymer carrying several —OH and/or amine and/or amide functional groups, in the form of a divided solid wherein said polymer is in the form of solid objects having particle size of less than 1 cm, is reacted with at least one cross-linking agent carrying at least two —R groups capable of reacting with the —OH, amine or amide groups of said polymer under the conditions of said stage (E1) in order to form a covalent bond between the polymer and the cross-linking agent, wherein said stage (E1) being carried out under temperature and pressure conditions where said polymer remains in the solid form and where said crosslinking agent is at least partially in the vapor form, whereby a crosslinking of the polymer within the particles of the divided solid is obtained;

wherein said polymer is in the form of isotropic objects with a mean particle size of between 1 micron and 100 microns or in the form of anisotropic objects in which the smallest dimension is between 1 micron and 250 microns.

2. The process as claimed in claim 1, the polymer employed in said stage (E1) is a polyvinyl alcohol (PVA).

3. The process as claimed in claim 1, wherein the at least two —R groups present on the crosslinking agent and suitable for forming covalent bonds by reaction with the —OH and/or amide groups of the polymer are aldehyde —CHO groups.

4. The process as claimed in claim 3, wherein the crosslinking agent is glutaraldehyde.

5. The process as claimed in claim 1, wherein the crosslinking agent/polymer ratio by weight is less than 2%.

6. The process as claimed in claim 1, wherein said stage (E1) suitable for activating the reaction between the —R groups of the crosslinking agent and the —OH or amide groups of the polymer is carried out in the presence of a catalyst.

7. The process as claimed in claim 1, wherein said stage (E1) of the process of the invention is carried out by first producing a blend of the polymer in the form of a divided solid with a second divided solid comprising the crosslinking agent and by then holding this blend under the temperature and pressure conditions where the polymer remains in the solid form and where said crosslinking agent is at least partially in the vapor form, said second divided solid being:

a solid comprising the crosslinking agent in the solid form; or a solid comprising the crosslinking agent in the liquid form deposited on a solid support.

8. The process as claimed in claim 1, wherein said stage (E1) is carried out by injecting the crosslinking agent in the liquid form within a confined reactor within which temperature and pressure conditions prevail where said polymer remains in the solid form and where said crosslinking agent is at least partially in the vapor form, whereby the crosslinking agent, introduced in the liquid form, vaporizes within the reactor.

9. The process as claimed in claim 1, wherein said stage (E1) is carried out at a temperature of less than 150° C.

10. The process as claimed in claim 1, which additionally comprises a stage (E2) of recovery of the solid obtained on conclusion of said stage (E1).

11. The process as claimed in claim 1, wherein said stage (E1) is followed by a stage (E3), wherein the solid obtained on conclusion of said stage (E1) is blended with other solid compounds suitable for forming a fluid of use in the field of oil extraction.

12. A fluid loss control agent in the solid form capable of being obtained according to said stage (E1) of the process of claim 1.

13. A method for improving the gas migration and/or fluid loss control properties of an oil cement grout, of a drilling fluid for oil application or of a fracturing fluid for oil application, said method comprising a step of using said control agent as claimed in claim 12.

14. A solid preblend for the manufacture of a fluid of use in the field of oil extraction capable of being obtained according to said stage (E3) of claim 11, comprising:
a fluid loss control agent in the solid form capable of being obtained according to said stage (E1) of the process of claim 1; and
other solid compounds suitable for forming a fluid of use in the field of oil extraction, in particular an oil cement grout, a drilling fluid for oil application or a fracturing fluid for oil application.

15. The process as claimed in claim 6, wherein said catalyst is being employed in the vapor form during said stage (E1).

16. The process as claimed in claim 9, wherein said stage (E1) is carried out at a temperature between 100 and 150° C.

* * * * *